United States Patent
Mahan et al.

(10) Patent No.: US 7,408,549 B1
(45) Date of Patent: Aug. 5, 2008

(54) METHOD FOR HARDWARE SORTED FRAGMENT COMPOSITION

(75) Inventors: Justin M. Mahan, Newark, CA (US); Michael A. Wasserman, Redwood City, CA (US); Kevin C. Rushforth, San Jose, CA (US)

(73) Assignee: Sun Microsystems,, Inc., Santa Clara, CA (US)

( * ) Notice: Subject to any disclaimer, the term of this patent is extended or adjusted under 35 U.S.C. 154(b) by 500 days.

(21) Appl. No.: 10/929,335

(22) Filed: Aug. 30, 2004

(51) Int. Cl.
  *G06T 15/40* (2006.01)
  *G06T 9/00* (2006.01)
  *G06G 5/00* (2006.01)
(52) U.S. Cl. .................. 345/422; 345/629; 345/555
(58) Field of Classification Search .......... 345/426, 345/506, 629, 418, 419, 421, 422, 530, 545, 345/555, 556, 581, 589, 592, 612, 614, 619
See application file for complete search history.

(56) References Cited

U.S. PATENT DOCUMENTS

| | | | |
|---|---|---|---|
| 6,366,289 B1 * | 4/2002 | Johns | ............ 345/543 |
| 6,369,830 B1 | 4/2002 | Brunner et al. | |
| 6,614,449 B1 * | 9/2003 | Morein | ............ 345/611 |
| 6,633,297 B2 | 10/2003 | McCormack et al. | |

OTHER PUBLICATIONS

Woo et al., "OpenGL Programming Guide", 1999, Addison-Wesley.*
Norman P. Jouppi and Chun-Fa Chang; "$Z^3$: An Economical Hardware Technique for High-Quality Antialiasing and Transparency"; Proceedings of the Eurographics/SIGGRAPH Workshop on Graphics Hardware; Aug. 1999; pp. 85-93, 143; Los Angeles, CA.

* cited by examiner

*Primary Examiner*—Kee M. Tung
*Assistant Examiner*—Joni Hsu
(74) *Attorney, Agent, or Firm*—Meyertons Hood Kivlin Kowert & Goetzel, P.C.; Jeffrey C. Hood; Mark K. Brightwell

(57) ABSTRACT

A graphics system including a frame buffer and a processing unit. The frame buffer contains N slots per pixel. Slots are used to store fragments. Suppose the N slots for a given pixel are occupied. In response to having received (or generated) a new fragment for the pixel, the processing unit may (a) blend the two backmost slots to liberate space for the new fragment, (b) blend the new fragment with the backmost slot in a first order, or, (c) blend the new fragment and the backmost slot in a second order. The choice of (a), (b) or (c) depends on the relationship of the new fragment's z value to the z values of the two backmost slots. The processing unit may be programmably configured to perform multi-pass order independent transparency in either front-to-back order or back-to-front order.

40 Claims, 4 Drawing Sheets

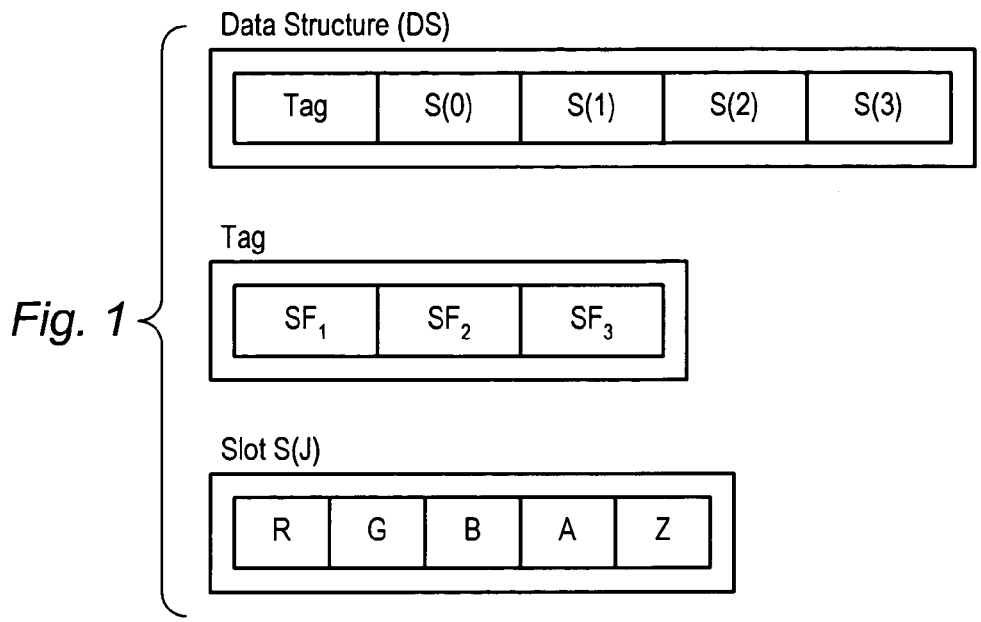
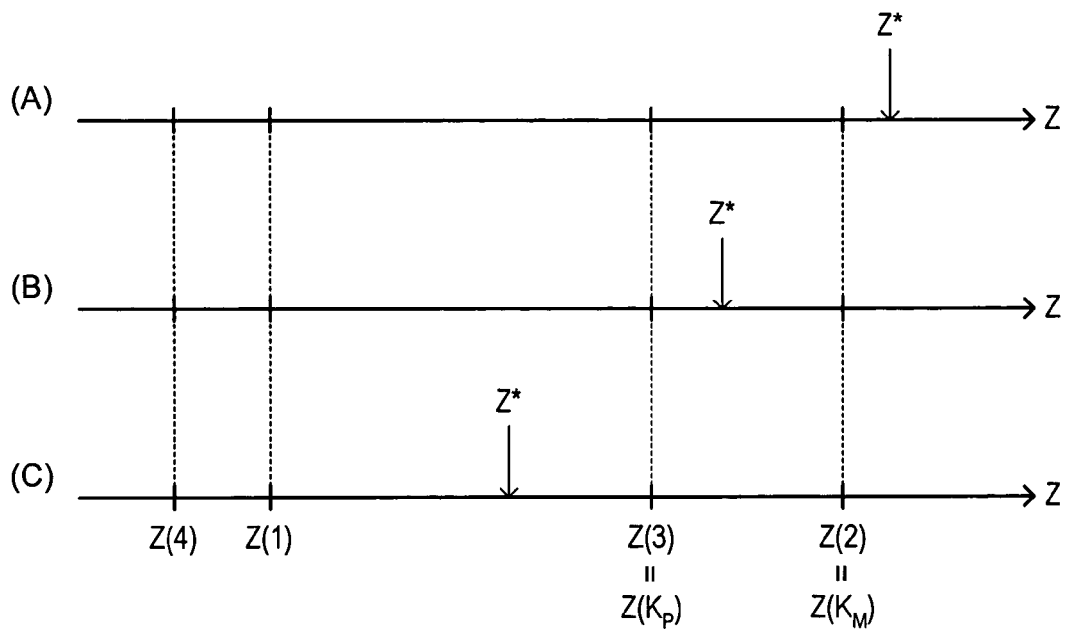
Fig. 2

| Slot | S(0) | S(1) | S(2) |
|---|---|---|---|
| Start | $Z_1$, White, $T_0$ | Empty | Empty |
| +A | $Z_1$, White, $T_0$ | $Z_A$, Blue, $T_1$ | Empty |
| +B | $Z_1$, White, $T_0$ | $Z_A$, Blue, $T_1$ | $Z_B$, Green, $T_2$ |
| +C | $Z_A$, Light Blue, $T_0$ | $Z_C$, Black, $T_2$ | $Z_B$, Green, $T_1$ |
| +D | $Z_D$, Pale Purple, $T_0$ | $Z_C$, Black, $T_2$ | $Z_B$, Green, $T_1$ |

Fig. 6

|  | Action |
|---|---|
| Start | Slot0 is cleared with white and depth value of 1.0 |
| +A | Fill empty slot1 with A's color and depth, set its layer tag to 0x1 |
| +B | Fill empty slot2 with B's color and depth, set its layer tag to 0x2 |
| +C | $Z_C$ is in front of $Z_A$ so we blend layer 1 with layer 0 to free slot 1.<br>$(Alpha_A*Blue) + ((1-Alpha_A)*White)$<br>Then set slot1's layer tag to 0x2 and slot2's layer tag to 0x1. |
| +D | $Z_D$ is behind $Z_B$, but in front of $Z_A$, so we blend D with layer 0<br>$(Alpha_D*Red) + ((1-Alpha_D)*Light Blue)$<br>All tags stay the same. |
| Video / Readback | The final color read back will blend all three layers together<br>$((Alpha_C*Black)$<br>$+ ((1.0-Alpha_C)$<br>$* ((Alpha_B*Green)$<br>$+ ((1-Alpha_B)*PalePurple))))$ |

Fig. 7

METHOD FOR HARDWARE SORTED FRAGMENT COMPOSITION

BACKGROUND OF THE INVENTION

1. Field of the Invention

This invention relates generally to the field of computer graphics and, more particularly, to a graphics system capable of performing order-independent transparency (OIT).

2. Description of the Related Art

Transparency may be described as the quality a surface has to transmit a percentage of the light that is incident on it. When a transparent surface is situated between a viewer and an opaque surface, the color $C_P$ perceived by the viewer, when gazing along a ray that intersects both surfaces, may be modeled by a linear interpolation between the color $C_{OP}$ of the opaque surface and the color $C_{TR}$ of the transparent surface as given by the formula:

$$C_P = C_{TR} A_{TR} + C_{OP}(1 - A_{TR}),$$

where $A_{TR}$ represents the coefficient of opacity of the transparent surface. ($A_{TR}=1$ represents total opacity and $A_{TR}=0$ represents total transparency.)

If a number of transparent surfaces intervene between the viewer and the opaque surface, the color perceived by the viewer may be computed by repeated application of the above formula, starting with the transparent surface farthest from the viewer and progressing in order of decreasing depth (i.e., towards the viewer). This process of repeated application may be described by the following recursive formula:

$$C^{(n)} = C_{TR}(n) A(n) + C^{(n-1)}(1 - A(n)),$$

for $n=1, 2, 3, \ldots, N_S$, where $N_S$ is the number of transparent surfaces. $C_{TR}(n)$ represents the color of the $n^{th}$ transparent surface in a back-to-front ordering of the transparent surfaces. $A(n)$ is the coefficient of opacity of the $n^{th}$ transparent surface. $C_{(O)}$ is the color of the opaque surface. The color $C^{(n)}$ represents the combined effect of the opaque surface and the first n transparent surfaces. Similarly, the color $C^{(n-1)}$ represents the combined effect of the opaque surface and the first $n-1$ transparent surfaces.

A software application, executing on a host computer, may sort object geometry (e.g., triangles) and send the geometry to graphics hardware in back-to-front order to implement the above algorithm. The graphics hardware includes rendering circuitry to render the object geometry into fragments. When a new fragment of a transparent surface is generated for a given pixel position (x,y), the current color $C^{(n-1)}$ of the pixel may be read from the frame buffer and combined with the color $C_f$ of the new fragment to determine an updated color for the pixel according to the relation $$C^{(n)} = C_f A_f + C^{(n-1)}(1 - A_f),$$

where $A_f$ is the opacity coefficient of the new fragment. The updated color $C^{(n)}$ may be written back to the frame buffer.

The process of sorting triangles into a back-to-front order may be computationally expensive. Any time the virtual camera moves or one or more objects move, the triangles need to be resorted. Furthermore, there are difficult issues that software applications have to handle, such as the splitting of intersecting triangles, the sorting of triangles that are generated by hardware vertex programs, and the sorting of triangles when a pixel shader modifies the z values of triangle vertices. Thus, there exists a substantial need for graphics hardware devices capable receiving triangles in an arbitrary order and operating on the triangles to model the effect of transparency.

SUMMARY

In one set of embodiments, a graphics system may be configured with a frame buffer and a processing unit. The frame buffer contains N slots per pixel, where N is a positive integer. The slots are used to store fragments. Suppose the N slots for a given pixel are all occupied with previously stored fragments. In response to having received (or generated) a new fragment for the pixel, the processing unit may (a) blend the two backmost slots to liberate space for the new fragment, (b) blend the new fragment with the backmost slot in a first order, or, (c) blend the new fragment and the backmost slot in a second order. The choice of (a), (b) or (c) may depends on the relationship of the new fragment's z value to the z values of the two backmost slots.

In some embodiments, the processing unit may be programmably configured to perform multi-pass order independent transparency in either front-to-back order or back-to-front order. The front-to-back order may be especially useful for operating on triangles in anticipation of subsequent anti-aliasing computations.

BRIEF DESCRIPTION OF THE DRAWINGS

A better understanding of the present invention can be obtained when the following detailed description is considered in conjunction with the following drawings, in which:

FIG. 1 illustrates embodiments for a data structure DS, a tag, and a slot;

FIG. 2 illustrates three possible scenarios (A), (B) and (C) for the relationship between the new fragment's z value (z*) and the z values of the two back slots;

FIG. 6 is a table showing the contents of each slot after each triangle fragment is incorporated;

FIG. 7 is a table describing the action that takes place in response to the incorporation of each fragment and the action that takes place at the time of video display (or pixel readback)

Figure 3:
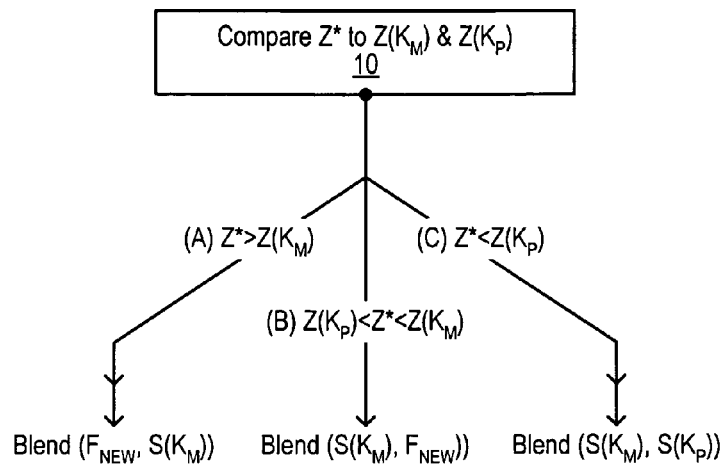
FIG. 3 is a flow diagram illustrating how the three possible scenarios (A), (B) and (C) are treated.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims. Note, the headings are for organizational purposes only and are not meant to be used to limit or interpret the description or claims. Furthermore, note that the word "may" is used throughout this application in a permissive sense (i.e., having the potential to, being able to), not a mandatory sense (i.e., must)." The term "include", and derivations thereof, mean "including, but not limited to". The term "connected" means "directly or indirectly connected", and the term "coupled" means "directly or indirectly connected".

DETAILED DESCRIPTION OF THE PREFERRED EMBODIMENTS

A graphics accelerator may be configured to support order independent transparency (OIT). OIT support means that software applications can provide unsorted geometry to the graphics accelerator. The graphics accelerator then renders the unsorted geometry and generates images whose quality approximates the quality that would be obtained by the more laborious method of sorting geometry on the host computer and submitting the sorted geometry to the graphics accelerator so that the graphics accelerator renders fragments in proper back-to-front order.

The graphics accelerator may include a processing unit and a frame buffer. The processing unit includes circuitry for performing rendering computations on graphics primitives (including triangles). The processing unit generates fragments from the primitives and stores the fragments into the frame buffer.

The frame buffer may be used to store an opaque layer and one or more transparent layers. Thus, the frame buffer may be configured to store an array of data structures corresponding to an array of pixels. The data structure for a given pixel includes N slots and a tag, where N is an integer greater than or equal to two.

Each slot stores a set of attribute values such as red, green, blue, alpha and z. (The z value is also referred to herein as "depth".) The tag may indicate which of the slots for the corresponding pixel are non-empty. Furthermore, the tag may indicate how the z values of the non-empty slots are ordered along the z axis.

Let $S(0), S(1), S(2), \ldots, S(N-1)$ denote the N slots of the data structure. FIG. 1 illustrates one embodiment for the arrangement of fields in the data structure DS in the N=4 case. Slot $S(J)$, $J=0, 1, 2, \ldots, N-1$, may include fields for red, blue, green, alpha and z values. (Any of various alternative color gamuts are contemplated. For example, in one alternative embodiment, YUV is used instead of RGB.) Let $z(J)$ denote the z value of the slot $S(J)$.

A pixel may be interpreted as a cone in 3D world space that intersects a number of transparent and/or opaque layers (i.e., surfaces of objects) in the world space. The processing unit receives triangles from the host computer in response to commands asserted by the software application, and renders the triangles into fragments. A fragment includes a set of attributes (such as red, green, blue, alpha and z) that represent the intersection of a triangle with a given pixel.

When the processing unit generates a new fragment for a pixel P, the processing unit reads the tag for the pixel P and examines the tag to determine if there are any empty slots in the corresponding data structure. If there is at least one empty slot, the new fragment is written into an empty slot and the tag is updated to reflect the depth ordering of the new set of non-empty slots (including the one just written and any that were non-empty before the write operation).

Let $k_M$ denote the index of the slot having the largest of the z values in the slots of a given data structure, i.e., $z(k) \leq z(k_M)$, $k=0, 1, 2, \ldots, N-1$. Let $k_P$ denote the index of the slot having the second largest of the z values in the slots of the given data structure: $z(k) \leq z(k_P) \leq z(k_M)$, $k \neq k_M$.

If there are no empty slots in the data structure, one of three operations may be performed depending on the relation of the z value of the new fragment to the values $z(k_M)$ and $z(k_P)$ as suggested by FIGS. 2 and 3 in the case N=4, $k_M=2$ and $k_P=3$. The tag may allow the processing unit to determine which slots of the N slots contain the values $z(k_M)$ and $z(k_P)$.

As indicated in step 10, the z value of the new fragment, denoted $z^*$, is compared to $z(k_M)$ and $z(k_P)$.

If $z^*$ is greater than or equal to $z(k_M)$ as illustrated by scenario (A), the processing unit may read the fragment $F_0$ stored in slot $S(k_M)$, blend the fragment $F_0$ with the new fragment $F_{NEW}$ to obtain a resultant fragment $F_R$, set the z-value of the resultant fragment equal to $z(k_M)$, and write the resultant fragment into slot $S(k_M)$. This blending operation may be performed according to the formula $$F_R = F_0 A_{NEW} + F_{NEW}(1-A_{NEW}),$$

where $A_{NEW}$ represents the opacity coefficient of the new fragment.

If $z^*$ is less than $z(k_M)$ but greater than or equal to $z(k_P)$ as illustrated in scenario (B), the processing unit may read the fragment $F_0$ stored in slot $S(k_M)$, blend the fragment $F_0$ with the new fragment $F_{NEW}$ to obtain a resultant fragment $F_R$, set the z-value of the resultant fragment equal to $z^*$, and write the resultant fragment into slot $S(k_M)$. This blending operation may be performed according to the formula $$F_R = F_{NEW} A_{NEW} + F_0 (1-A_{NEW}).$$

If $z^*$ is less than $z(k_P)$ as illustrated in scenario (C), the processing unit may read the fragment $F_0$ stored in slot $S(k_M)$ and the fragment $F_1$ stored in slot $S(k_P)$, blend the two fragments to obtain a resultant fragment $F_R$, set the z-value of the resultant fragment equal to $z(k_P)$, and write the resultant fragment to the slot $S(k_M)$. This blending operation may be performed according to the relation $$F_R = F_1 A_1 + F_0 (1-A_1),$$

where $A_1$ is the opacity coefficient of the fragment $F_1$. Furthermore, the new fragment is written to slot $S(k_P)$. The tag is updated to reflect the new ordering of the slots due to the insertion of the new fragment, and the updated tag is written back to the frame buffer.

At the beginning of each frame, prior to rendering any fragments for the frame, the data structures may be initialized. Initializing a data structure may involve loading one slot with a fragment corresponding to a user-defined background color at a user-defined depth (e.g., z=1) and initializing the tag to indicate that all remaining slots are empty. In one set of embodiments, slot $S(0)$ in each data structure is the slot that gets loaded with the background color.

At the end of each frame (or, more generally, whenever host software asserts an appropriate command), the processing unit may perform a depth-sorted blended copy to obtain a final color for each pixel before the buffers of the double-buffered frame buffer are swapped (or pixels are read back to host memory). The depth-sorted blended copy has the frame buffer as its source and destination. The tag, and then the non-empty slots (as indicated by the tag), in each data structure are read from the frame buffer and the non-empty slots are blended together in back-to-front order as indicated by the tag. The final color resulting from the blending of the non-empty slots is written back to one of the slots in the data structure, e.g., to slot $S(0)$. The other slots in the data structure may be cleared by appropriately setting certain bits in the tag and writing the tag back into the data structure.

After completing the blend copy, the video output circuitry may read the final color values for each pixel from the frame buffer and generate a video output signal from the final color values. The video output signal may be supplied to a display device such as a video monitor, a projector or a head-mounted display.

The OIT processing methodology just described gives correctly ordered blending for up to N layers. If the number of layers intersected by a given pixel is greater than N, it is possible for fragments to be blended out of order. However, the incorrectly ordered fragments will be the fragments farthest from the viewpoint, and thus, the fragments which are already most obscured. Thus, the probability of perceiving any adverse visual effect due to out-of-order blending of the back-most layers is low.

In some embodiments, the processing unit may be additionally configured to perform supersampling, i.e., to compute samples at up to N sample positions in each pixel. Before the first transparent fragment for a given pixel has been encountered in the rendering of a frame, all N slots of the corresponding data structure may be allocated to storing supersamples. As transparent fragments (corresponding to transparent layers) for the given pixel are encountered, slots may be reallocated to store the transparent fragments. Thus, the level of supersampling for a given pixel may decrease as transparent fragments for the given pixel are encountered. Therefore, there is a trade-off between anti-aliasing quality and OIT quality.

In one embodiment, the processing unit drops the level of supersampling for a pixel from N to N/2 when a first transparent fragment for the pixel is encountered. When the processing unit encounters a second transparent fragment for any of the N/2 sample positions of the pixel, the processing unit may drop the supersampling level for the pixel from N/2 to N/4. In general, when the processing unit is operating at a supersampling level of $N/(2^K)$ and encounters a $(2^K)^{th}$ transparent fragment for any of the $N/(2^K)$ sample positions of the pixel, the processing unit drops the supersampling level from $N/(2^K)$ to $N/(2^{K+1})$. The processing unit may continue to drop the supersampling level in this fashion to accommodate more layers of transparent fragments until the supersampling level is one (i.e., all N slots are allocated to layers—one back layer and N−1 transparent layers).

A way to estimate the amount of memory required for the frame buffer is to compute the product $M_A(N_A+1)$, were $M_A$ is the desired average level of supersampling per pixel and $N_A$ is the average expected number of layers of transparency per pixel.

The OIT processing feature of the graphics accelerator may be enabled using a simple software interface. In one set of embodiments, the software interface may have a form similar the following:

glEnable(ORDER_INDEPENDENT_BLENDING_SUN).

A wide variety of other interfaces are contemplated.

The pseudo-code given below illustrates one embodiment for the OIT methodology performed by the processing unit. The depth test referred to in the pseudo-code may be the currently set OpenGL depth test. In some embodiments, the depth test may also include a stencil test and/or an alpha test. The notation $T_k$, k=0, 1, 2, . . . , N−1, represents the back-to-front ordering of the z values in the slots. Thus, Slot $S(T_k)$ is the slot whose z value occupies the $k^{th}$ position in the back-to-front ordering. Therefore, Slot $S(T_0)$ is the same as Slot $S(k_M)$, and Slot $S(T_1)$ is the same as Slot $S(k_P)$.

```
for each fragment (computed during frame rendering) {
    read tag
    read depth values for occupied slots
    if (at least one empty slot) {
        write fragment to empty slot}
    }
    if (no empty slot) {
        if (depth test fails against slot S(T₀) {
            blend with slot S(T₀) using fragment as dst and slot
                S(T₀) as src}
        } else {
            if depth test fails against slot S(T₁) {
                blend with slot S(T₀) using fragment as src and slot
                    S(T₀) as dst}
            } else {
                blend slot S(T₀) and slot S(T₁) using slot S(T₁) as src
                    and slot S(T₀) as dst
                write result to slot S(T₀)
                write fragment to slot S(T₁)
            }
        }
    }
    update tag based on new sort order
    write tag
} for each pixel position (in the window prior to buffer swap) {
    read tag
    read all occupied slots
    result=slot S(T₀);
    for (k=1;k<N;k++){
        result=blend(result, slot S(Tₖ))
        write result to slot S(T₀)
    }
}
```

The pseudo-code given above is meant to suggest the processing that is to be performed by circuitry in the processing unit in response to commands asserted by the host software.

In some embodiments, Slot S(0) may be reserved for the fragment farthest from the viewer, i.e., the fragment having the maximum z value. In this case, the tag field may include N−1 subfields denoted $SF_1, SF_2, SF_3, \ldots, SF_{N-1}$ as suggested by FIG. 1 in the case N=4. Each subfield $SF_J$, J=1, 2, . . . , N−1, contains a set of bits that indicates the position of z(J), i.e., the z value of Slot S(J), in the back-to-front ordering of the z values of all the slots.

In one embodiment, the subfield $SF_J$ has N possible states, one state representing the case where Slot S(J) is empty, and N−1 states representing the possible positions of the Slot S(J) in the back-to-front ordering. Thus, the subfield $SF_J$ may be assigned a number of bits equal to the ceiling of $\log_2(N)$.

As discussed above, the frame buffer may store a tag for each pixel position in a given window. The tag may have any of a wide variety of formats.

Figure 4:
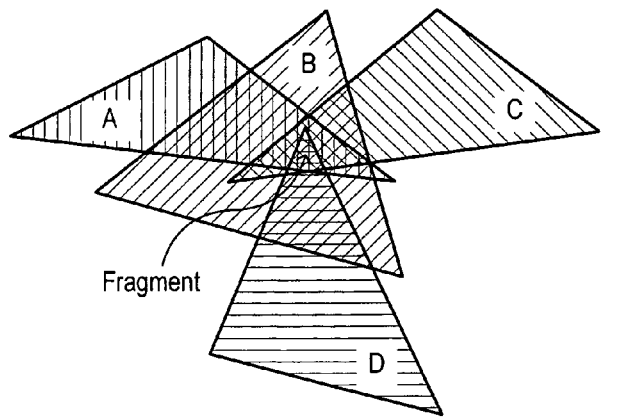
FIG. 4 illustrates a series of triangles A, B, C and B that overlap and thus induce the generation of fragments in the overlap region.
Figure 5:
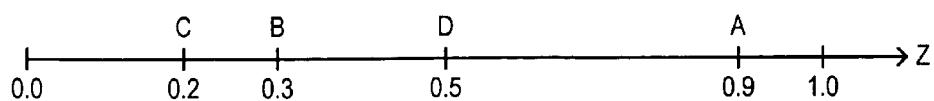
FIG. 5 shows an exemplary set of z values for the fragments induced by triangles A, B, C and D.

FIG. 4 illustrates an example of the OIT methodology according to one embodiment in the case N=3. In this example, four triangles are written one after another. First, the frame buffer is cleared. Then triangle A is written, then B, C, and D. FIG. 5 shows the depth value of the fragment in each triangle.

FIG. 6 shows the contents of the 3 slots after each triangle is written. Each successive row corresponds to another triangle. Each column corresponds to a different slot. The frame buffer in this example starts out white, with a depth value of 1.0 (corresponding to infinite remoteness from the viewpoint). The contents of the fields include depth (z), color and tag value.

FIG. 7 shows the action that takes place as each triangle is written. The last row shows the action that takes place when the frame buffer is read for video output or for readback of pixels to the host.

In one set of embodiments, the frame buffer may be realized using synchronous dynamic random access memory (SDRAM). In one embodiment, the frame buffer may be double-data-rate (DDR) SDRAM.

Various Alternatives

There are other features that could take advantage of the multiple slots per pixel and the circuitry (configured in the processing unit) for operating with the multiple slots.

1. Host Object Sort to Include all Layers

When there are more layers than slots, the OIT methodology described above may end up blending the back-most layers of transparent geometry in an unordered fashion. However, if host software performs a rough sort on the geometry so that no fragment is more than N+1 spots out of order (where N is the number of slots per pixel) and then sends the roughly sorted geometry down to the processing unit, the OIT methodology as described above will be able blend all the layers in the proper back-to-front order. The OIT methodology is able to correct for small-scale perturbations in fragment order. The expense of performing the rough sort decreases as N increases. Host software may implement the rough sorting of fragments by performing a sort on objects. Complex objects may be split to ensure that no object has more than N+1 layers of transparency.

2. Multi-Pass OIT Methodology

With a few modifications, the processing unit may be configured to support OIT with all the layers of an arbitrary complexity scene by rendering the scene in multiple passes.

In a preliminary pass, the host software sends to the processing unit the opaque geometry of the scene. After rendering the opaque geometry, the processing unit will have captured into the frame buffer the closest opaque fragment for each pixel into Slot $S(0)$ of that pixel.

In a first pass, the host software sends to the processing unit the transparent geometry of the scene. After rendering the transparent geometry, the processing unit will have captured into the frame buffer the N−1 fragments per pixel that are farthest back (i.e., have the largest z values) among those fragments that are in front of the closest opaque fragment in Slot $S(0)$. These N−1 fragments are stored into slots $S(1)$, $S(2), S(3), \ldots, S(N-1)$. Before starting the second pass on the transparent geometry, the processing unit collapses the N fragments (i.e., the back opaque fragment and the N−1 transparent fragments) per pixel into a single fragment by blending the N fragments in a back-to-front order as indicated by the tag. The single fragment is assigned the z value of the closest of the N−1 transparent fragments, and then, the single fragment is written into Slot $S(0)$. Slots $S(1)$, $S(2)$, $S(3), \ldots$, $S(N−1)$ are cleared (e.g., by setting all subfields of the tag to zero and writing the updated tag to the frame buffer) to liberate these slots for the next pass.

In a second pass, the host software may send the same transparent geometry to the processing unit. After rendering the transparent geometry again, the processing unit will have captured into the frame buffer the N−1 fragments per pixel that are farthest back among those fragments that are in front of the fragment represented by Slot $S(0)$. These N−1 fragments are stored into slots $S(1)$, $S(2)$, $S(3), \ldots, S(N−1)$. Before starting the third pass on the transparent geometry, the processing unit collapses the N fragments in slots $S(0)$, $S(1)$, $S(2), S(3), \ldots, S(N-1)$ into a single fragment by blending the N fragments in a back-to-front order as indicated by the tag. The single fragment is assigned the z value of the closest of the N−1 fragments, and then, the single fragment is written into slot $S(0)$. Again slots $S(1)$, $S(2)$, $S(3), \ldots, S(N-1)$ are cleared to liberate these slots for the next pass.

The third and successive passes on the transparent geometry are similar.

In general, each pass captures the N−1 transparent fragments per pixel that are farthest away from the viewer subject to the constraint of being closer than the transparent and opaque fragments captured in previous passes.

The processing unit may maintain an overflow bit to indicate when an overflow event has occurred in a given pass. An overflow event is said to occur when (1) a new transparent fragment for a pixel is determined to be closer than the fragment in Slot $S(0)$, (2) and the slots $S(1)$, $S(2)$, $S(3), \ldots, S(N-1)$ corresponding to the pixel are already occupied with previous discovered transparent fragments.

The processing unit may discard the new transparent fragment if it is closer than the closest of the fragments already stored in the slots $S(1)$, $S(2)$, $S(3), \ldots, S(N-1)$. Alternatively, the new transparent fragment may overwrite one of the already-stored fragments if it is farther back than the closest of the already stored fragments.

The host computer may examine the overflow bit at the end of each pass to determine if a next pass needs to be performed. Prior to receiving the transparent geometry for each pass, the host computer may set the overflow bit to zero.

As previously defined, the notation $T_k$, $k=0, 1, 2, \ldots, N-1$, represents the back-to-front ordering of the z values in the slots. Thus, Slot $S(T_0)$ is the slot whose z value is farthest away from the viewer, i.e., "farthest back". More generally, Slot $S(T_k)$ is the slot whose z value occupies the $k^{th}$ position in the back-to-front ordering. The current discussion assumes that the circuitry in the processing unit is configured so that slot $S(0)$ is reserved for storing the "farthest back" fragment. Under this assumption, $T_0$ is always equal to 0. However, other embodiments are contemplated where slots other than $S(0)$ are reserved for storing the "farthest back" fragment.

In addition to the subfields $SF_1, SF_2, \ldots, SF_{N-1}$, the tag for each pixel may store an integer variable $k_F$ that indicates the non-empty slot closest to the viewer: $z(k_F) \leq z(k)$, $k \in \{0, 1, 2, \ldots, N-1\}$ and $S(k)$ non-empty.

As an initialization step, prior to the rendering of a frame, the processing unit may initialize the data structure for each pixel in the frame. To initialize a data structure, the processing unit may:

(a) write a fragment having a user-defined background color and user-defined depth
(e.g., z=1) to Slot $S(0)$;

(b) set the subfields of the tag to indicate that slots $S(1)$, $S(2)$, $S(3), \ldots, S(N-1)$ are empty;

(c) set the value $k_F=0$;

(d) write the tag to the data structure.

Figure 8:
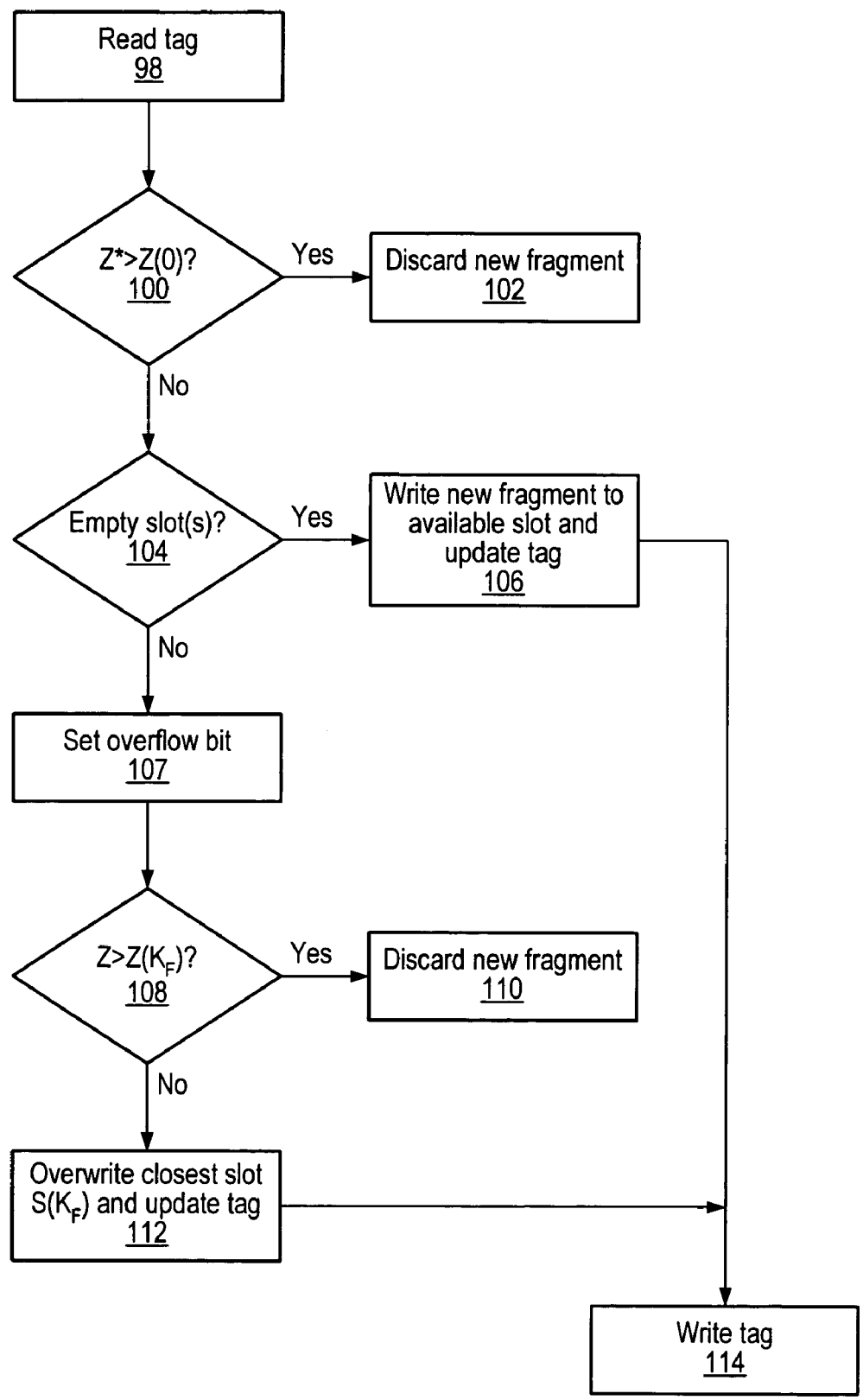
FIG. 8 is a flowchart for a multi-pass order independent transparency method which operates in back-to-front order.

In any given pass on the transparent geometry, the processing unit generates transparent fragments corresponding to pixels in the frame. Having generated a new fragment for a pixel P, the processing unit may operate on the new transparent fragment as suggested in FIG. 8.

In step 98, the processing unit may read the tag for the pixel P from the frame buffer.

In step 100, the processing unit may compare the z-value z* of the new fragment to the z-value z(0) of "back fragment" which resides in slot S(0). This comparison is referred to herein as the "early z test". If the value z* is greater than z(0) the processing unit may discard the new transparent fragment as indicated in step 102. If the value z* is less than or equal to z(0), the processing unit may execute step 104.

In step 104, the processing unit may examine the tag subfields to determine if there is at least one empty slot in the data structure corresponding to pixel P. If there is at least one empty slot, the processing unit may write the new fragment into one of the empty slots as indicated in step 106. This write operation may be represented by the expression $S(k_{WR}) \leftarrow F_{NEW}$, where $k_{WR}$ is the index of the targeted slot. The processing unit assigns the index value $k_{WR}$ of the targeted slot to the variable $k_F$: $k_F \leftarrow k_{WR}$. Furthermore, the processing unit updates the tag subfields to indicate the non-empty status of slot $S(k_{WR})$ and to reflect the new back-to-front ordering of the non-empty slots due to the insertion of the new fragment.

If all the slots are already occupied (i.e., non-empty), the processing unit may set the overflow bit (step 107) and execute step 108.

In step 108, the processing unit may compare the z-value z* of the new fragment to the z-value $z(k_F)$ of the closest slot. If the value z* is less than the value $z(k_F)$, the processing unit may discard the new fragment (step 110). If the value z* is greater than or equal to the value $z(k_F)$, the processing unit may execute step 112.

In step 112, the processing unit may overwrite the slot $S(k_F)$ with the new fragment: $S(k_F) \leftarrow F_{NEW}$, update the tag subfields to reflect the new back-to-front ordering of the slots due to the insertion of the new fragment, and update the variable $k_F$ to indicate the new closest slot.

In step 114, the processing unit may write the updated tag back to the frame buffer.

The OIT circuitry of the processing unit may be programmable. In particular, the processing unit may include one or more programmable comparators. A programmable comparator compares two operands A and B based on a programmably determined operator (e.g., one of $>\geq$, $=$, $\leq$, $<$). To configure the processing unit for the multi-pass OIT methodology described above, host software may:

(a) set early z test to be "<";
(b) set sort z test to be "<";
(c) set a variable to select "overwrite of closest slot in case of overflow";
(d) set another variable to select "discard new fragment if early z test fails".

The following pseudo-code summarizes the multi-pass OIT methodology according to one set of embodiments:

Render all opaque geometry;
do
{
clear overflow bit;
render transparent geometry;
blend the slots in back-to-front order (the new Slot S(0) has the z value of the closest slot);
} while (overflow bit=1)
output pixels to display device;

In one alternative embodiment, the processing unit may maintain an overflow bit per pixel (instead of a global overflow bit) and a global overflow count. The processing unit may set the overflow bit for a pixel when an overflow event for the pixel occurs. Furthermore, the processing unit may increment the global overflow count when a pixel experiences its first overflow event. At the end of a pass, the global overflow count may indicate the number of pixels which experienced at least one overflow event. The host software application may choose to terminate (i.e. not perform any additional passes) when the overflow count is smaller than a user-defined threshold.

3. Bounded Multi-Pass OIT

In the previous multi-pass methodology (described above), the processing unit is configured to capture layers and blend them in a back-to-front order, and thus, early termination of the multi-pass methodology implies that layers closest to the viewer will not get incorporated into the displayed output pixels. These closest layers are often the most important layers in terms of image quality. Thus, in one set of embodiments the processing unit may be programmably configured to capture and blend layers in a front-to-back order. Therefore, if the host software application terminates early the layers that fail to get incorporated will be the back most layers. Given M passes on the transparent geometry (where M is a positive integer), the front-to-back methodology may be able to achieve better image quality on average than the back-to-front methodology.

The blend equations that allow front-to-back blending are:

$$C^{(m)} = C_{TR}(m) A_{TR}(m) A^{(m-1)} + C^{(m-1)}$$

$$A^{(m)} = A^{(m-1)} - A_{TR}(m) A^{(m-1)}$$

where m is an integer index indicating the front-to-back ordering of the transparent layers;

$C_{TR}(m)$ is the color of the $m^{th}$ transparent fragment in the front-to-back ordering;

$A_{TR}(m)$ is the opacity of the $m^{th}$ transparent fragment;

$C^{(m)}$ is the resultant color after having blended layers up through the $m^{th}$ transparent layer;

$A^{(m)}$ is the resultant opacity after having blended layers up through the $m^{th}$ transparent layer.

The processing unit may be programmably configured to operate in the front-to-back-mode or the back-to-front mode. To program the processing unit to operate in the front-to-back mode, the host software application may:

Set early z test to ">"
Set sort z test to ">"
Overflow flatten top layer
Overflow flatten operation is z test greater, no blend (except last pass can have blend)
Flatten blend mode
srcRGBfactor    SRC_ALPHA_MULT_DST_ALPHA_SUN
dstRGBfactor ONE
BlendEquation RGB FUNC_ADD
srcAlphafactor DST_ALPHA
dstAlphafactor ONE
BlendEquationAlpha FUNC_REVERSE_SUBTRACT
In one set of embodiments, a bounded multi-pass OIT methodology may be performed as indicated in the following pseudo-code under the assumption that the processing unit has been configured for front-to-back operation.
clear z buffer to 0.0;
clear alpha buffer to 1.0;
clear color buffer to black;
for (p=0; p<max_passes; p++) {
clear overflow bit;
Render all geometry;
Blend all Slots (the new slot S(0) takes the z value of the farthest layer)
if (overflow bit=1)
break;
}

4. Bounded Multi-Pass Anti-Aliased Polygons

The same front-to-back methodology (described above) may be used to support anti-aliased triangles.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A graphics system comprising:
a frame buffer configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty;
a processing unit configured to:
(a) generate a new fragment corresponding to a first pixel, wherein the new fragment specifies a color value and z value,
(b) read the tag from the data structure corresponding to the first pixel,
(c) examine the tag to determine if there is at least one empty slot among the N slots of the data structure;
(d) compare the z value of the new fragment to the two largest z values among the z values in the N slots of the data structure if said examination of the tag determines that there are no empty slots in the data structure; and
(e) if said comparison determines that the z value of the new fragment is smaller than the two largest z values:
blend color values of the two slots corresponding to the two largest z values as indicated by the tag to obtain a resultant color,
compose a resultant fragment from the resultant color and the smaller of the two largest z values, and
write the resultant fragment to one of the two slots and write the new fragment to the other of the two slots.

2. The graphics system of claim 1, wherein the processing unit is configured to:
(f) if said comparison determines that the z value of the new fragment is less than the larger of the two largest z values and greater than the smaller of the two largest z values:
blend the new fragment with the slot corresponding to the larger of the two largest z values to obtain a resultant color,
compose a resultant fragment from the resultant color and the z value of the new fragment, and
write the resultant fragment to the slot corresponding to the larger of the two largest z values.

3. The graphics system of claim 2, wherein the processing unit is configured to:
(g) if said comparison determines that the z value of the new fragment is greater than the larger of the two largest z values:
blend the new fragment with the slot corresponding to the larger of the two largest z values to obtain a resultant color,
compose a resultant fragment from the resultant color and the larger of the two largest z values; and
write the resultant fragment to the slot corresponding to the larger of the two largest z values.

4. The graphics system of claim 3, wherein the processing unit is configured to:
if said examining the tag determines that there is an empty slot among the N slots of the data structure:
update the tag to indicate a new z-value ordering of the new fragment and fragments stored in any non-empty slots among the N slots, and
write the new fragment to the empty slot of the data structure and write the updated tag to the data structure.

5. The graphics system of claim 3, wherein the processing unit is further configured to generate a stream of fragments corresponding to pixels in the pixel array and to perform (a), (b), (c), (d), (e), (f) and (g) for each fragment in said stream.

6. The graphics system of claim 1, wherein the processing unit includes rendering hardware configured to generate said new fragment in response to a received graphics primitive.

7. The graphics system of claim 1, wherein the frame buffer is double-buffered.

8. The graphics system of claim 1, wherein the processing unit is configured to:
generate a final fragment for each pixel in the pixel array by:
reading the tag of the data structure corresponding to the pixel;
reading the color value for each non-empty slot of the N slots, as indicated by the tag, from the frame buffer;
determining, from the tag, which of the non-empty slots of the data structure has a minimum z value;
reading the minimum z value from the data structure;
performing a depth-sorted blending operation on the color values to determine a final color;
composing the final fragment from the final color and the minimum z value;
clear the tag;
write the final fragment to a pre-selected slot among the N slots of the data structure; and
write the cleared tag to the data structure.

9. The graphics system of claim 1, wherein the processing unit is further configured to read the final fragments from the data structures in the frame buffer, generate pixel values from the final fragments, and provide the pixel values for output to a display device.

10. The graphics system of claim 1, wherein the processing unit includes programmable comparators.

11. The graphics system of claim 1 further comprising a host computer, wherein the host computer is configured to execute program instructions, wherein the program instructions direct the host computer to perform a partial sort of transparent geometry prior to sending the transparent geometry to the processing unit, wherein the partial sort arranges the transparent geometry so that no fragment is more than N+1 positions away from its position in a perfect back-to-front ordering.

12. A graphics system comprising:
a frame buffer configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty, wherein the tag contains a closest slot index;

a processing unit configured to:
(a) generate a new fragment corresponding to a first pixel, wherein the new fragment specifies a color value and z value,
(b) read the tag from the data structure corresponding to the first pixel,
(c) compare the z value of the new fragment to the z value of a farthest slot among the N slots of the data structure;
(d) examine the tag to determine if there is at least one empty slot among the N slots of the data structure if said comparison (c) indicates that the z value of the new fragment is less than the z value of the farthest slot;
(e) compare the z value of the new fragment to the z value of the closest slot among the N slots of the data structure if there are no empty slots among the N slots of the data structure;
(f) if the comparison (e) indicates that the z value of the new fragment is greater than the z value of the closest slot:
overwrite the closest slot with the new fragment to insert the new fragment into the data structure,
update the tag to indicate a new ordering of the fragments in response to the insertion of the new fragment and to indicate a new closest slot;
write the tag to the frame buffer.

13. The graphics system of claim 12, wherein the processing unit is configured to:
(g) discard the new fragment if the comparison (e) indicates that the z value of the new fragment is less than the z value of the closest slot.

14. The graphics system of claim 13, wherein, if said examination indicates that there is an empty slot among the N slots of the data structure, the processing unit is configured to:
write the new fragment to the empty slot to add the new fragment to the data structure;
update the tag to indicate a new ordering of the fragments in response to the addition of the new fragment and to indicate a new closest slot;
write the tag to the frame buffer.

15. The graphics system of claim 14, wherein, if said comparison (c) indicates that the z value of the new fragment is greater than the z value of the farthest slot, the processing unit is configured to discard the new fragment.

16. The graphics system of claim 12, wherein the new fragment is a transparent fragment.

17. The graphics system of claim 12, wherein, in response to a command from a host computer, the processing unit is configured to:
blend color values of the non-empty slots of the data structure in a back-to-front order as indicated by the tag to generate a resultant color;
compose a resultant fragment from the resultant color and the z value of the closest slot;
write the resultant fragment to a predetermined slot of the first pixel in the frame buffer;
update the tag to indicate that slots other than the predetermined slot are empty;
write the updated tag to the frame buffer.

18. The graphics system of claim 12, wherein the processing unit includes one or more programmable comparators.

19. A graphics system comprising:
a frame buffer configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty, wherein the tag contains a closest slot index;
a processing unit configured to:
(a) generate a new fragment corresponding to a first pixel, wherein the new fragment specifies a color value and z value,
(b) read the tag from the data structure corresponding to the first pixel,
(c) compare the z value of the new fragment to the z value of a closest slot among the N slots of the data structure;
(d) examine the tag to determine if there is at least one empty slot among the N slots of the data structure if said comparison (c) indicates that the z value of the new fragment is greater than the z value of the closest slot;
(e) compare the z value of the new fragment to the z value of the farthest slot among the N slots of the data structure if there are no empty slots among the N slots of the data structure;
(f) if the comparison (e) indicates that the z value of the new fragment is less than the z value of the farthest slot:
overwrite the farthest slot with the new fragment to insert the new fragment into the data structure,
update the tag to indicate a new ordering of the fragments in response to the insertion of the new fragment and to indicate a new farthest slot;
write the tag to the frame buffer.

20. The graphics system of claim 19, wherein the processing unit is configured to:
(g) discard the new fragment if the comparison (e) indicates that the z value of the new fragment is greater than the z value of the farthest slot.

21. The graphics system of claim 20, wherein, if said examination indicates that there is an empty slot among the N slots of the data structure, the processing unit is configured to:
write the new fragment to the empty slot to add the new fragment to the data structure;
update the tag to indicate a new ordering of the fragments in response to the addition of the new fragment and to indicate a new farthest slot;
write the tag to the frame buffer.

22. The graphics system of claim 21, wherein, if said comparison (c) indicates that the z value of the new fragment is less than the z value of the closest slot, the processing unit is configured to discard the new fragment.

23. The graphics system of claim 19, wherein, in response to a command from a host computer, the processing unit is configured to:
blend color values of the non-empty slots of the data structure in a front-to-back order as indicated by the tag to generate a resultant color;
compose a resultant fragment from the resultant color and the z value of the farthest slot;
write the resultant fragment to a predetermined slot of the first pixel in the frame buffer;
update the tag to indicate that slots other than the predetermined slot are empty;
write the updated tag to the frame buffer.

24. The graphics system of claim 19, wherein the processing unit is configured to perform triangle anti-aliasing.

25. A method comprising:
(a) generating a new fragment corresponding to a first pixel, wherein the new fragment specifies a color value and z value,
(b) reading a tag corresponding to the first pixel from a frame buffer, wherein the frame buffer is configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty;
(c) examining the tag to determine if there is at least one empty slot among the N slots of the data structure;
(d) comparing the z value of the new fragment to the two largest z values among the z values in the N slots of the data structure if said examination of the tag determines that there are no empty slots in the data structure; and
(e) if said comparison determines that the z value of the new fragment is smaller than the two largest z values:
 blending color values of the two slots corresponding to the two largest z values as indicated by the tag to obtain a resultant color,
 composing a resultant fragment from the resultant color and the smaller of the two largest z values, and
 writing the resultant fragment to one of the two slots and write the new fragment to the other of the two slots.

26. The method claim 25 further comprising:
(f) if said comparison determines that the z value of the new fragment is less than the larger of the two largest z values and greater than the smaller of the two largest z values:
 blending the new fragment with the slot corresponding to the larger of the two largest z values to obtain a resultant color,
 composing a resultant fragment from the resultant color and the z value of the new fragment, and
 writing the resultant fragment to the slot corresponding to the larger of the two largest z values.

27. The method of claim 26 further comprising:
(g) if said comparison determines that the z value of the new fragment is greater than the larger of the two largest z values:
 blending the new fragment with the slot corresponding to the larger of the two largest z values to obtain a resultant color,
 composing a resultant fragment from the resultant color and the larger of the two largest z values; and
 writing the resultant fragment to the slot corresponding to the larger of the two largest z values.

28. The method of claim 26 further comprising:
if said examining the tag determines that there is an empty slot among the N slots of the data structure:
 updating the tag to indicate a new z-value ordering of the new fragment and fragments stored in any non-empty slots among the N slots, and
 writing the new fragment to the empty slot of the data structure and write the updated tag to the data structure.

29. The method of claim 25 further comprising:
generating a final fragment for each pixel in the pixel array by:
 reading the tag of the data structure corresponding to the pixel;
 reading the color value for each non-empty slot of the N slots, as indicated by the tag, from the frame buffer;
 determining, from the tag, which of the non-empty slots of the data structure has a minimum z value;
 reading the minimum z value from the data structure;
 performing a depth-sorted blending operation on the color values to determine a final color;
 composing the final fragment from the final color and the minimum z value;
clearing the tag;
writing the final fragment to a pre-selected slot among the N slots of the data structure; and
writing the cleared tag to the data structure.

30. The method of claim 25 further comprising:
performing a partial sort of transparent geometry prior to sending the transparent geometry to the processing unit, wherein the partial sort arranges the transparent geometry so that no fragment is more than N+1 positions away from its position in a perfect back-to-front ordering.

31. A method comprising:
(a) generating a new fragment corresponding to a first pixel, wherein the new fragment specifies a color value and z value;
(b) reading a tag corresponding to the first pixel from a frame buffer, wherein the frame buffer is configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty, wherein the tag contains a closest slot index;
(c) comparing the z value of the new fragment to the z value of a farthest slot among the N slots of the data structure;
(d) examining the tag to determine if there is at least one empty slot among the N slots of the data structure if said comparison (c) indicates that the z value of the new fragment is less than the z value of the farthest slot;
(e) comparing the z value of the new fragment to the z value of the closest slot among the N slots of the data structure if there are no empty slots among the N slots of the data structure;
(f) if the comparison (e) indicates that the z value of the new fragment is greater than the z value of the closest slot:
 overwriting the closest slot with the new fragment to insert the new fragment into the data structure,
 updating the tag to indicate a new ordering of the fragments in response to the insertion of the new fragment and to indicate a new closest slot;
 writing the tag to the frame buffer.

32. The method of claim 31 further comprising:
(g) discarding the new fragment if the comparison (e) indicates that the z value of the new fragment is less than the z value of the closest slot.

33. The method of claim 32 further comprising:
if said examination indicates that there is an empty slot among the N slots of the data structure:
 writing the new fragment to the empty slot to add the new fragment to the data structure;
 updating the tag to indicate a new ordering of the fragments in response to the addition of the new fragment and to indicate a new closest slot;
 writing the tag to the frame buffer.

34. The method of claim 33 further comprising:
discard the new fragment if said comparison (c) indicates that the z value of the new fragment is greater than the z value of the farthest slot.

35. The method of claim 31 further comprising:
receiving a command from a host computer; and
in response to receiving the command from the host computer:
- blending color values of the non-empty slots of the data structure in a back-to-front order as indicated by the tag to generate a resultant color;
- composing a resultant fragment from the resultant color and the z value of the closest slot;
- writing the resultant fragment to a predetermined slot of the first pixel in the frame buffer;
- updating the tag to indicate that slots other than the predetermined slot are empty;
- writing the updated tag to the frame buffer.

36. A method comprising:
(a) generating a new fragment corresponding to a first pixel, wherein the new fragment specifies a color value and z value,
(b) reading a tag corresponding to the first pixel from a frame buffer, wherein the frame buffer is configured to store an array of data structures corresponding to an array of pixels, wherein each data structure, corresponds to a single pixel, and includes N slots and a tag, wherein N is an integer greater than or equal to two, wherein each of the N slots is configured to store a color value and z value for a corresponding fragment, wherein the tag indicates, for each of the N slots, whether the slot is empty, wherein the tag also indicates an ordering according to z value for the slots that are non-empty, wherein the tag contains a closest slot index;
(c) comparing the z value of the new fragment to the z value of a closest slot among the N slots of the data structure;
(d) examining the tag to determine if there is at least one empty slot among the N slots of the data structure if said comparison (c) indicates that the z value of the new fragment is greater than the z value of the closest slot;
(e) comparing the z value of the new fragment to the z value of the farthest slot among the N slots of the data structure if there are no empty slots among the N slots of the data structure;
(f) if the comparison (e) indicates that the z value of the new fragment is less than the z value of the farthest slot:
- overwriting the farthest slot with the new fragment to insert the new fragment into the data structure,
- updating the tag to indicate a new ordering of the fragments in response to the insertion of the new fragment and to indicate a new farthest slot;
- writing the tag to the frame buffer.

37. The method of claim 35 further comprising:
(g) discarding the new fragment if the comparison (e) indicates that the z value of the new fragment is greater than the z value of the farthest slot.

38. The method of claim 37 further comprising:
if said examination indicates that there is an empty slot among the N slots of the data structure:
- writing the new fragment to the empty slot to add the new fragment to the data structure;
- updating the tag to indicate a new ordering of the fragments in response to the addition of the new fragment and to indicate a new farthest slot;
- writing the tag to the frame buffer.

39. The method of claim 38 further comprising:
discarding the new fragment if said comparison (c) indicates that the z value of the new fragment is less than the z value of the closest slot.

40. The method of claim 39 further comprising:
receiving a command from a host computer; and
in response to receiving the command from the host computer:
- blending color values of the non-empty slots of the data structure in a front-to-back order as indicated by the tag to generate a resultant color;
- composing a resultant fragment from the resultant color and the z value of the farthest slot;
- writing the resultant fragment to a predetermined slot of the first pixel in the frame buffer;
- updating the tag to indicate that slots other than the predetermined slot are empty;
- writing the updated tag to the frame buffer.

* * * * *